(12) United States Patent
Schweitzer et al.

(10) Patent No.: US 10,239,363 B2
(45) Date of Patent: Mar. 26, 2019

(54) TIRE WITH CHAFER AND TOEGUARD

(71) Applicant: The Goodyear Tire & Rubber Company, Akron, OH (US)

(72) Inventors: Claude Schweitzer, Colmar-Berg (LU); Kundan Kumar, Colmar-Berg (LU); Jean-Louis Marie Félicien Thomas, Waltzing (BE); François Philippe Depouhon, Arlon (BE); Evangelia Konstantaki, Hunsdorf (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 21 days.

(21) Appl. No.: 16/036,241

(22) Filed: Jul. 16, 2018

(65) Prior Publication Data

US 2018/0319223 A1 Nov. 8, 2018

Related U.S. Application Data

(62) Division of application No. 14/552,997, filed on Nov. 25, 2014, now Pat. No. 10,052,918.

(Continued)

(51) Int. Cl.
*B60C 15/06* (2006.01)
*B60C 15/00* (2006.01)
*B60C 1/00* (2006.01)

(52) U.S. Cl.
CPC ........ *B60C 15/06* (2013.01); *B60C 2001/005* (2013.01); *B60C 2015/0614* (2013.01); *Y10T 152/10828* (2015.01)

(58) Field of Classification Search
None
See application file for complete search history.

(56) References Cited

U.S. PATENT DOCUMENTS 5,023,292 A * 6/1991 Hong ..................... C08K 5/353
152/547
5,033,524 A * 7/1991 Ohtsuka .................. B60C 15/06
152/539

(Continued)

FOREIGN PATENT DOCUMENTS

EP 1671814 A1 6/2006
EP 1685983 B1 3/2008

(Continued)

OTHER PUBLICATIONS

Machine Translation: JP-2009154861-A; Kodama, Takashi; (Year: 2018).*
Machine Translation: JP-02179515-A; Hanada, Ryoji; (Year: 2018).*

*Primary Examiner* — Kendra Ly
(74) *Attorney, Agent, or Firm* — John D. DeLong

(57) ABSTRACT

The present invention relates to a pneumatic tire having a pair of spaced apart bead components, a connecting carcass between the bead components, a pair of sidewalls overlying the carcass, and a rubber chafer portion adjacent to each of the sidewalls and positioned around at least a portion of each of the bead components and intended for contacting a rigid rim of a wheel, the rubber chafer portion comprising a radially innermost toe guard and a chafer adjacent to a radially outer end of the toe guard; wherein the ratio of a modulus of the toe guard to a modulus of the chafer is in the range of 3 to 10.

5 Claims, 1 Drawing Sheet

Related U.S. Application Data

(60) Provisional application No. 61/909,690, filed on Nov. 27, 2013.

(56) References Cited

U.S. PATENT DOCUMENTS

| | | |
|---|---|---|
| 5,180,457 A | 1/1993 | Honbo et al. |
| 5,476,129 A | 12/1995 | Shoyama |
| 5,591,282 A | 1/1997 | Weber et al. |
| 5,979,527 A | 11/1999 | Kobayashi et al. |
| 6,135,182 A | 10/2000 | Nagai |
| 6,138,733 A | 10/2000 | Nakamura |
| 7,441,577 B2 | 10/2008 | Hunt et al. |
| 8,539,999 B2 | 9/2013 | Pingenat et al. |
| 2002/0046795 A1 | 4/2002 | Billieres |
| 2009/0020206 A1 | 1/2009 | Hunt et al. |
| 2012/0160392 A1 | 6/2012 | Van Riper |
| 2012/0220706 A1 | 8/2012 | Mruk et al. |
| 2013/0056126 A1 | 3/2013 | Ueyoko et al. |

FOREIGN PATENT DOCUMENTS

| | | | |
|---|---|---|---|
| JP | 02179515 A | * | 7/1990 |
| JP | H02179515 A | | 7/1990 |
| JP | H06344713 A | | 12/1994 |
| JP | 8-156533 | | 6/1996 |
| JP | 11-301220 | | 11/1999 |
| JP | 2009154861 A | * | 7/2009 |
| JP | 2009154861 A | | 7/2009 |

\* cited by examiner

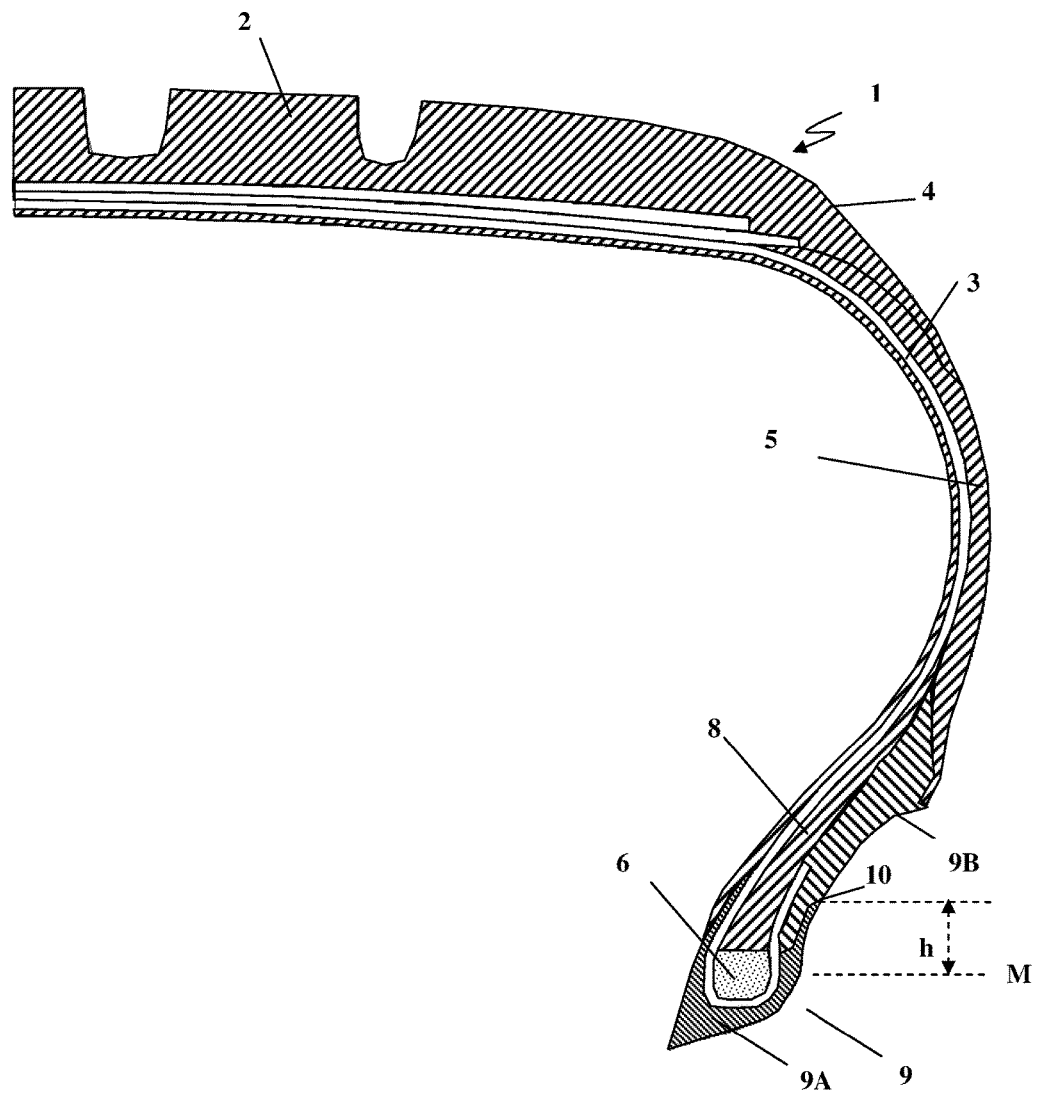

TIRE WITH CHAFER AND TOEGUARD

BACKGROUND OF THE INVENTION

Pneumatic rubber tires conventionally have two spaced apart, relatively inextensible beads, usually composed of twisted, or cabled, metallic wires, which are surrounded by rubber components. A significant component which is conventionally positioned around a portion of the bead is the chafer portion. The chafer portion, including a chafer and toe guard, is a rubber composition conventionally designed to contact a rigid wheel rim and, therefore, interface between the tire and rim. Rather obviously, the chafer rubber composition must normally be very abrasion resistant, tough, and have a relatively high modulus while also having acceptable flex and rubber fatigue properties as well as having good resistance to cut growth.

The chafer rubber composition is conventionally composed of a diene-based rubber composition which is carbon black reinforced. The chafer rubber composition may optionally contain a textile fabric reinforcement for dimensional stability, where the textile fabric portion of the chafer is conventionally adjacent to the bead portion of the tire, leaving the rubber portion of the chafer to contact the rigid wheel rim when the tire is mounted on such rim and inflated.

SUMMARY OF THE INVENTION

The present invention relates to a pneumatic tire having a pair of spaced apart bead components, a connecting carcass between the bead components, a pair of sidewalls overlying the carcass, and a rubber chafer portion adjacent to each of the sidewalls and positioned around at least a portion of each of the bead components and intended for contacting a rigid rim of a wheel, the rubber chafer portion comprising a radially innermost toe guard and a chafer adjacent to a radially outer end of the toe guard; wherein the ratio of a modulus of the toe guard to a modulus of the chafer is in the range of 3 to 10.

BRIEF DESCRIPTION OF THE DRAWINGS

FIG. 1 illustrates a tire according to the present invention.

DETAILED DESCRIPTION OF THE INVENTION

The present invention relates to a pneumatic tire having a pair of spaced apart bead components, a connecting carcass between the bead components, a pair of sidewalls overlying the carcass, and a rubber chafer portion adjacent to each of the sidewalls and positioned around at least a portion of each of the bead components and intended for contacting a rigid rim of a wheel, the rubber chafer portion comprising a radially innermost toe guard and a chafer adjacent to a radially outer end of the toe guard; wherein the ratio of a modulus of the toe guard to a modulus of the chafer is in the range of 3 to 10.

For illustration of one embodiment of the invention, reference is made to FIG. 1, in which is depicted a bisected cross-sectional view of a belted radial ply tire 1.

In FIG. 1, components of tire 1 are shown as being its tread 2, sidewall(s) 5, shoulder region(s) 4 abridging the tread 2 and sidewall(s) 5, spaced "bundled" wire beads 6 with apexes 8 and supporting fabric reinforced carcass 3.

The chafer portion 9 of the tire is positioned in its bead region 6, basically between the bead 6 and the rigid tire rim on which the tire is to be mounted.

The chafer portion 9 has a toe guard 9A that is the radially innermost portion of the chafer and is located radially inward of the bead 6. The chafer portion 9 also has a chafer 9B adjacent to the radially outer end 10 of the toe guard 9A. The chafer 9B extends radially outward towards the sidewall 5.

The radially outer end 10 of the toe guard 9A is positioned axially at the outer surface of the tire, and positioned radially relative to a fixed point M on the tire. M is the position corresponding to the mold ring line imparted by the tire cure mold. Alternatively, M corresponds to the radial center of the bead 6. The radially outer end 10 is positioned at a distance h measured radially from M.

The distance h has been found to be best in a range from 3 mm radially inward from M to 5 mm radially outward, in order to give a desirable balance of tire handling and rolling resistance. Alternatively, the distance h may extend up to 60 mm radially outward. Alternatively, the distance h may extend up to 20 mm radially outward.

The chafer and toe guard are fabricated from differing rubber compositions, such that the ratio of a modulus of the toe guard to the modulus of the chafer is in a range of 3 to 10. In one embodiment, the ratio of a modulus of the toe guard to the modulus of the chafer is in a range of from 5 to 8.

In one embodiment, the modulus of the toe guard and chafer may be characterized as the G' measured at 1 percent strain at a given temperature, for example at 100° C. In one embodiment, the G' at 1 percent strain for the toe guard may range from 10 to 30 MPa. In one embodiment, the G' at 1 percent strain for the toe guard may range from 10 to 25 MPa. In one embodiment, the G' at 1 percent strain for the toe guard may range from 18 to 23 MPa. In one embodiment, the G' at 1 percent strain for the chafer may range from 2 to 4 MPa. In one embodiment, the G' at 1 percent strain for the chafer may range from 2.2 to 3.6 MPa.

G' may be measured for example following ASTM D5289 using the Rubber Process Analyzer as RPA 2000 instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26 and May 10, 1993.

The chafer and toe guard may also be characterized by their hardness values. In one embodiment, the hardness is characterized as the Shore A hardness as measured by ASTM D2240. In one embodiment, the shore A hardness of the toe guard is at least 80.

In various embodiments, the rubber compositions of the chafer and toe guard, while different, may contain a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate. Additional examples of rubbers which may be used include a carboxylated rubber, silicon-coupled and tin-coupled star-branched polymers. In one embodiment the rubber or elastomers are polybutadiene and synthetic or natural polyisoprene.

In one embodiment, the rubber may be a blend of at least two diene based rubbers. In one embodiment, a blend of two or more rubbers may be used such as cis 1,4-polyisoprene rubber (natural or synthetic) and cis 1,4-polybutadiene rubbers.

In one embodiment, the rubber may be a blend of from 40 to 60 phr of polybutadiene, and from 60 to 40 phr of polyisoprene.

The solution polymerization prepared SBR (S-SBR) typically has a bound styrene content in a range of about 5 to about 50, alternatively about 9 to about 36, percent. The S-SBR can be conveniently prepared, for example, by organo lithium catalyzation in the presence of an organic hydrocarbon solvent.

The cis 1,4-polybutadiene rubber (BR) is considered to be beneficial for a purpose of enhancing the tire wear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

Commonly employed siliceous pigments which may be used in the rubber compounds include conventional pyrogenic and precipitated siliceous pigments (silica). In one embodiment precipitated silica is used. The conventional siliceous pigments that may be employed in this invention are in one embodiment precipitated silicas such as, for example, those obtained by the acidification of a soluble silicate, e.g., sodium silicate.

Such conventional silicas might be characterized, for example, by having a BET surface area, as measured using nitrogen gas, in one embodiment in the range of about 40 to about 600, and in another embodiment in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia-Solvay, with, for example, designations of Z1165MP, Z165GR, and Z200MP and silicas available from Degussa AG with, for example, designations VN2 and VN3, etc.

In one embodiment, the rubber composition of the toe guard includes from 40 to 80 phr of a high surface carbon black.

Representative of such high surface area carbon black for purposes of this invention are rubber reinforcing carbon blacks which have an Iodine absorption value in a range of from about 100 to about 300 g/kg. Representative of such carbon blacks are, for example, according to their ASTM designations, N110, N121, N134, N191, N220, N233, N234, N242, and N293.

The rubber composition may further contain an in-situ resin that is the reaction product of a methylene acceptor and a methylene donor.

In-situ resins are formed in the rubber composition and involve the reaction of a methylene acceptor and a combination methylene donor. The term "methylene donor" is intended to mean a chemical capable of reacting with a methylene acceptor and generate the resin in-situ. Examples of methylene donors which are suitable for use in the present invention include hexamethylene tetramine and N-substituted oxymethylmelamines, of the general formula:

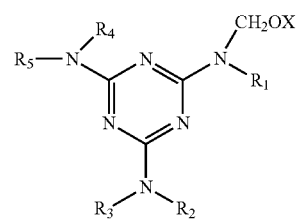

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine, N,N'N"-tributyl-N,N',N"-trimethylol-melamine, hexamethoxymethylmelamine, and hexaethoxymethylmelamine. The N-methylol derivatives of melamine are prepared by known methods.

The amount of methylene donor in the rubber composition may vary. In one embodiment, the amount of additional methylene donor ranges from 0.5 to 4 phr. In another embodiment, the amount of additional methylene donor ranges from 1 to 3 phr.

The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof. Examples of methylene acceptors include but are not limited to those disclosed in U.S. Pat. No. 6,605,670; U.S. Pat. No. 6,541,551; U.S. Pat. No. 6,472,457; U.S. Pat. No. 5,945,500; U.S. Pat. No. 5,936,056; U.S. Pat. No. 5,688,871; U.S. Pat. No. 5,665,799; U.S. Pat. No. 5,504,127; U.S. Pat. No. 5,405,897; U.S. Pat. No. 5,244,725; U.S. Pat. No. 5,206,289; U.S. Pat. No. 5,194,513; U.S. Pat. No. 5,030,692; U.S. Pat. No. 4,889,481; U.S. Pat. No. 4,605,696; U.S. Pat. No. 4,436,853; and U.S. Pat. No. 4,092,455. Examples of modified phenol novolak resins include but are not limited to cashew nut oil modified phenol novolak resin, tall oil modified phenol novolak resin and alkyl modified phenol novolak resin. In one embodiment, the methylene acceptor is resorcinol.

Other examples of methylene acceptors include activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from SI Group (formerly Schenectady Chemicals) under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor in the rubber composition may vary. In one embodiment, the amount of methylene acceptor ranges from 10 to 30 phr. In another embodiment, the amount of methylene acceptor ranges from 15 to 25 phr.

In one embodiment the rubber composition for use in the tire component may additionally contain a sulfur containing organosilicon compound. Examples of suitable sulfur containing organosilicon compounds are of the formula:

$$Z\text{-Alk-}S_n\text{-Alk-}Z \qquad \text{I}$$

in which Z is selected from the group consisting of

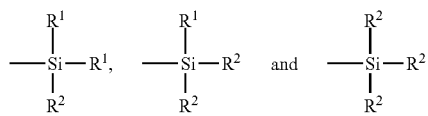

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

In one embodiment the sulfur containing organosilicon compounds are the 3,3'-bis(trimethoxy or triethoxy silylpropyl) sulfides. In one embodiment the compounds are 3,3'-bis(triethoxysilylpropyl) disulfide and 3,3'-bis(triethoxysilylpropyl) tetrasulfide. Therefore as to the above formula I, in one embodiment Z is

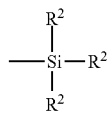

where $R^2$ is an alkoxy of 2 to 4 carbon atoms, with 2 carbon atoms being used in one embodiment; alk is a divalent hydrocarbon of 2 to 4 carbon atoms with 3 carbon atoms being used in one embodiment; and n is an integer of from 2 to 5 with 2 and 4 being used in one embodiment.

The amount of the sulfur containing organosilicon compound of the above formula in a rubber composition will vary depending on the level of other additives that are used. Generally speaking, the amount of the compound of the above formula will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur vulcanizing agent is elemental sulfur. The sulfur vulcanizing agent may be used in an amount ranging from 0.5 to 8 phr, with a range of from 1.5 to 6 phr being used in one embodiment. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils in an amount ranging from 0 to 30 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, in another embodiment about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator is in one embodiment a guanidine, dithiocarbamate, thiuram, or a second sulfenamide compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur-containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The chafer and sidewall may be a components of various types of pneumatic tires, including but not limited to passenger car tires, truck tires, aircraft tires, and off-the-road tires.

The chafer and sidewall may be constructed by any of various rubber processing methods as are known in the art, including but not limited to calendaring and extrusion. The tire with the chafer may be constructed using methods as are known in the art.

Vulcanization of the tire is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air.

The invention is further illustrated by the following non-limiting example.

Example

In this example, the use of a compound for use as a stiff toe guard compound is illustrated. A rubber compound was mixed as shown in Table 1. The compound was tested for physical properties, as indicated in Table 2.

TABLE 1

| Compound[1] | Parts (phr) |
| --- | --- |
| Natural rubber | 100 |
| Rubber reinforcing carbon black[2] | 55 |
| Phenol-formaldehyde resin | 20 |
| Hexamethylenetetramine | 3 |
| Process Oil | 5.25 |

[1]The compound further contained standard amounts of waxes, antidegradants, zinc oxide, stearic acid, sulfur, and cure accelerators.
[2]Carbon black having an Iodine absorption value (ASTM D1510) of about 200 g/kg

TABLE 2

| Zwick Die C | |
|---|---|
| 100% Modulus, MPa | 5.8 |
| 200% Modulus, MPa | 10.3 |
| 300% Modulus, MPa | 15.3 |
| Tensile Strength, MPa | 20.4 |
| Elongation at Break, % | 407 |
| True Tensile, MPa | 103.6 |
| Shore D | |
| Hardness | 41 |
| MDR at 150° C. | |
| Min T | 4.31 |
| $T_{25}$, min | 5.81 |
| $T_{90}$, min | 15.91 |
| T-1 | 37.46 |
| MDR at 191 C. | |
| MIN T | 3.68 |
| $T_{25}$, min | 0.53 |
| $T_{90}$, min | 1.13 |
| RPA | |
| G'@1%, MPa | 20.4 |
| G"@1% | 1.902 |
| J"@1% | 0.0045 |
| Tan D | 0.233 |
| G'@15%, MPa | 5.893 |
| MOONEY S. | |
| T + 5 | 13.2 |
| T + 20 | 53.9 |

The cured compound showed the desired stiffness level for use as a stiff toe guard.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a pair of spaced apart bead components, a connecting carcass between the bead components, a pair of sidewalls overlying the carcass, and a rubber chafer portion adjacent to each of the sidewalls and positioned around at least a portion of each of the bead components and intended for contacting a rigid rim of a wheel, the rubber chafer portion comprising a radially innermost toe guard and a chafer adjacent to a radially outer end of the toe guard; the toe guard having the radially outer end disposed at a sidewall axially outer surface and the radially outer end of the toe guard located from 3 mm radially inward from a radial center of a bead to 60 mm radially outward from the radial center of the bead; wherein a ratio of a modulus of the toe guard to a modulus of the chafer is in the range of 5 to 8;
wherein the toe guard comprises a rubber composition comprising
100 parts by weight, per 100 parts by weight of elastomer (phr) of a diene based elastomer;
10 to 30 phr of a phenolic resin; and
40 to 80 phr of a carbon black having an Iodine absorption value in a range of from about 100 to about 300 g/kg;
wherein the modulus is measured as G' at 1 percent strain and 100° C., and G' for the toe guard ranges from 10 to 30 MPa, and G' for the chafer ranges from 2 to 4 MPa.

2. The pneumatic tire of claim 1, wherein the modulus is measured as G' at 1 percent strain and 100° C., and G' for the toe guard ranges from 10 to 25 MPa.

3. The pneumatic tire of claim 1, wherein the modulus is measured as G' at 1 percent strain and 100° C., and G' for the toe guard ranges from 18 to 23 MPa.

4. The pneumatic tire of claim 1, wherein the modulus is measured as G' at 1 percent strain and 100° C., and G' for the chafer ranges from 2.2 to 3.6 MPa.

5. The pneumatic tire of claim 1, the toe guard having the radially outer end disposed at a sidewall axially outer surface and the radially outer end of the toeguard located from 3 mm radially inward from a radial center of a bead to 20 mm radially outward from the radial center of the bead.

* * * * *